(12) United States Patent
Hodde (10) Patent No.: US 9,518,693 B2
(45) Date of Patent: *Dec. 13, 2016

(54) PIG RECEIVER ASSEMBLY

(71) Applicant: Power Associates International, Inc., Houston, TX (US)

(72) Inventor: James R. Hodde, Houston, TX (US)

(73) Assignee: Power Associates International, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,087

(22) Filed: Feb. 12, 2015

(65) Prior Publication Data
US 2015/0152993 A1      Jun. 4, 2015

Related U.S. Application Data

(60) Division of application No. 13/535,033, filed on Jun. 27, 2012, now Pat. No. 9,310,016, which is a continuation-in-part of application No. 12/795,576, filed on Jun. 7, 2010, now Pat. No. 8,312,584, which is a continuation-in-part of application No. 12/754,518, filed on Apr. 5, 2010, now Pat. No. 8,689,384.

(51) Int. Cl.
*B08B 9/04*      (2006.01)
*F16L 55/46*     (2006.01)

(52) U.S. Cl.
CPC .......... *F16L 55/46* (2013.01); *Y10T 29/49815* (2015.01); *Y10T 137/0435* (2015.04)

(58) Field of Classification Search
CPC ..................................................... F16L 55/46

USPC ....... 15/3.51, 104.62; 137/268, 244, 153.07; 134/8

See application file for complete search history.

(56) References Cited

U.S. PATENT DOCUMENTS

| 3,063,080 A | 11/1962 | Bergman et al. |
| 3,166,094 A | 1/1965 | Eagleton |
| 3,170,226 A | 2/1965 | Allan |
| 2,840,016 A | 6/1968 | Chouinard et al. |

(Continued)

FOREIGN PATENT DOCUMENTS

| DE | 35 17 751 A1 | 11/1986 |
| DE | 9004899 U1 | 7/1990 |

(Continued)

OTHER PUBLICATIONS

USPTO Notice of Allowance for U.S. Appl. No. 13/535,033 Dated Jul. 20, 2015.

(Continued)

*Primary Examiner* — Laura C Guidotti
(74) *Attorney, Agent, or Firm* — Tumey L.L.P.

(57) ABSTRACT

A pig receiver and method retrieve pigs in pipeline pigging operations. In one embodiment, a pig receiver includes a pig receiver unit. The pig receiver also includes a pig gate valve assembly disposed on the pig receiving unit. The pig gate valve assembly includes a gate valve. The pig gate valve assembly also includes a first actuator and a second actuator. The pig gate valve assembly further includes a cylinder guide. In addition, the pig gate valve assembly includes a tie bar. Actuation of the tie bar actuates the gate valve. An end of the tie bar is attached to the first actuator, and an opposing end of the tie bar is attached to the second actuator. The pig receiver also includes a system for removing contaminants from the pig receiver.

20 Claims, 8 Drawing Sheets

(56) References Cited

U.S. PATENT DOCUMENTS

| | | | |
|---|---|---|---|
| 3,547,142 | A | 12/1970 | Webb |
| 3,809,113 | A | 5/1974 | Grove et al. |
| 3,908,682 | A | 9/1975 | Thompson |
| 4,967,702 | A | 11/1990 | Richeson et al. |
| 5,139,576 | A | 8/1992 | Davis |
| 5,444,886 | A | 8/1995 | Takashina et al. |
| 5,883,303 | A | 3/1999 | Bliss et al. |
| 5,980,645 | A | 11/1999 | Price |
| 6,022,421 | A | 2/2000 | Bath et al. |
| 6,769,152 | B1 | 8/2004 | Crenshaw et al. |
| 6,841,007 | B1 | 1/2005 | Howard et al. |
| 8,028,972 | B2 | 10/2011 | Lijima et al. |
| 8,052,801 | B2 | 11/2011 | Freeman et al. |
| 8,225,809 | B2 | 7/2012 | Krywitsky |
| 8,296,894 | B2 | 10/2012 | Watson et al. |
| 8,312,584 | B2 | 11/2012 | Hodde |
| 8,689,384 | B2 | 4/2014 | Hodde |
| 2001/0003307 | A1 | 6/2001 | Sivacoe |
| 2002/0185261 | A1 | 12/2002 | Sivacoe |
| 2006/0196543 | A1 | 9/2006 | Hunt et al. |
| 2007/0174983 | A1 | 8/2007 | Smith et al. |
| 2009/0095933 | A1 | 4/2009 | McGuire et al. |
| 2011/0120499 | A1 | 5/2011 | Pruett et al. |
| 2011/0240135 | A1 | 10/2011 | Hodde |
| 2014/0245550 | A1* | 9/2014 | Hodde .................. F16L 55/46 15/104.062 |

FOREIGN PATENT DOCUMENTS

| | | |
|---|---|---|
| DE | 298 09 720 U1 | 10/1999 |
| DE | 10144860 A1 | 6/2002 |
| EP | 2422890 A1 | 2/2012 |
| EP | 2 679 876 A2 | 1/2014 |

OTHER PUBLICATIONS

European Search Report for Application No. EP 15167749.9 dated Oct. 8, 2015.
USPTO Notice of Allowance for U.S. Appl. No. 12/795,576 dated Aug. 10, 2012.
European Extended Search Report for European Patent Application 13173539.1 dated Jan. 7, 2014.
USPTO Office Action for U.S. Appl. No. 13/535,033 dated Nov. 25, 2014.
USPTO Notice of Allowance for U.S. Appl. No. 13/688,750 dated Sep. 12, 2013.
USPTO Notice of Allowance for U.S. Appl. No. 12/754,518 dated Nov. 20, 2013.
USPTO Office Action for U.S. Appl. No. 12/795,576 dated Jan. 12, 2012.
USPTO Office Action for U.S. Appl. No. 13/688,750 dated May 21, 2013.
USPTO Office Action for U.S. Appl. No. 12/754,518 dated Nov. 21, 2012.
USPTO Office Action for U.S. Appl. No. 12/754,518 dated May 14, 2013.

* cited by examiner

PIG RECEIVER ASSEMBLY

CROSS-REFERENCE TO RELATED APPLICATIONS

This application is a divisional application of U.S. application Ser. No. 13/535,033 filed on Jun. 27, 2012, which is a continuation-in-part application of U.S. Pat. No. 8,312,584 issued on Nov. 20, 2012, which is a continuation-in-part application of U.S. Pat. No. 8,689,384 issued on Apr. 8, 2014, which are herein incorporated by reference in their entirety.

STATEMENT REGARDING FEDERALLY SPONSORED RESEARCH OR DEVELOPMENT

Not applicable.

BACKGROUND OF THE INVENTION

Field of the Invention

This invention relates to the field of pipeline maintenance and more specifically to the field of using pipeline pigs for pipeline maintenance and new construction.

Background of the Invention

Pipeline pigs are conventionally used in the maintenance of pipelines. Pipeline pigs are typically inserted into a pig launcher. Pressure may then be added that pushes the pipeline pig along the pipeline until it reaches a pig receiver for removal from the pipeline. The pipeline pigs are commonly used to remove foreign material that may be in the line during construction of new pipelines. The pipeline pigs may also be used to make sure the pipeline has not become dented or wrinkled during bending or laying as well as also used to check for the ovalness of the pipeline. Further uses of the pipeline pigs may include removing water from pipelines after hydrostatic tests.

Drawbacks to conventional pig receivers include harm to the environment. For instance, matter removed from the pipelines may not be properly contained. Additional drawbacks to conventional pig receivers include downtime in launching new pipeline pigs when other pipeline pigs are being removed from the pipeline.

Consequently, there is a need for an improved pig receiver that allows pipeline pigs to be continually launched and received in pipelines. Further needs include improved pig receivers that facilitate environmental concerns.

BRIEF SUMMARY OF SOME OF THE PREFERRED EMBODIMENTS

These and other needs in the art are addressed in one embodiment by a pig receiver that includes a pig receiver unit. The pig receiver also includes a pig gate valve assembly disposed on the pig receiving unit. The pig gate valve assembly includes a gate valve. The pig gate valve assembly also includes a first actuator and a second actuator. The pig gate valve assembly further includes a cylinder guide. In addition, the pig gate valve assembly includes a tie bar. Actuation of the tie bar actuates the gate valve. An end of the tie bar is attached to the first actuator, and an opposing end of the tie bar is attached to the second actuator. The pig receiver also includes a system for removing contaminants from the pig receiver.

In addition, these and other needs in the art are addressed in an embodiment by a method for retrieving a pipeline pig. The method includes allowing the pipeline pig to run into a pig receiver. The pig receiver includes a pig receiver unit comprising a retrieval door. The pig receiver also includes a pig gate valve assembly disposed on the pig receiving unit. The pig gate valve assembly includes a gate valve. The gate valve is in an open position. In addition, the pig gate valve assembly includes a first actuator and a second actuator. The pig gate valve assembly also includes a cylinder guide. The pig gate valve assembly further includes a tie bar. Actuation of the tie bar actuates the gate valve. An end of the tie bar is attached to the first actuator, and an opposing end of the tie bar is attached to the second actuator. The pig receiver also includes a contaminant removal system. The contaminant removal system includes removing contaminants from the pig receiver unit with a fluid. The method also includes actuating the pig gate valve assembly to move the gate valve to a closed position. In addition, the method includes opening the retrieval door. The method further includes retrieving the pig.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
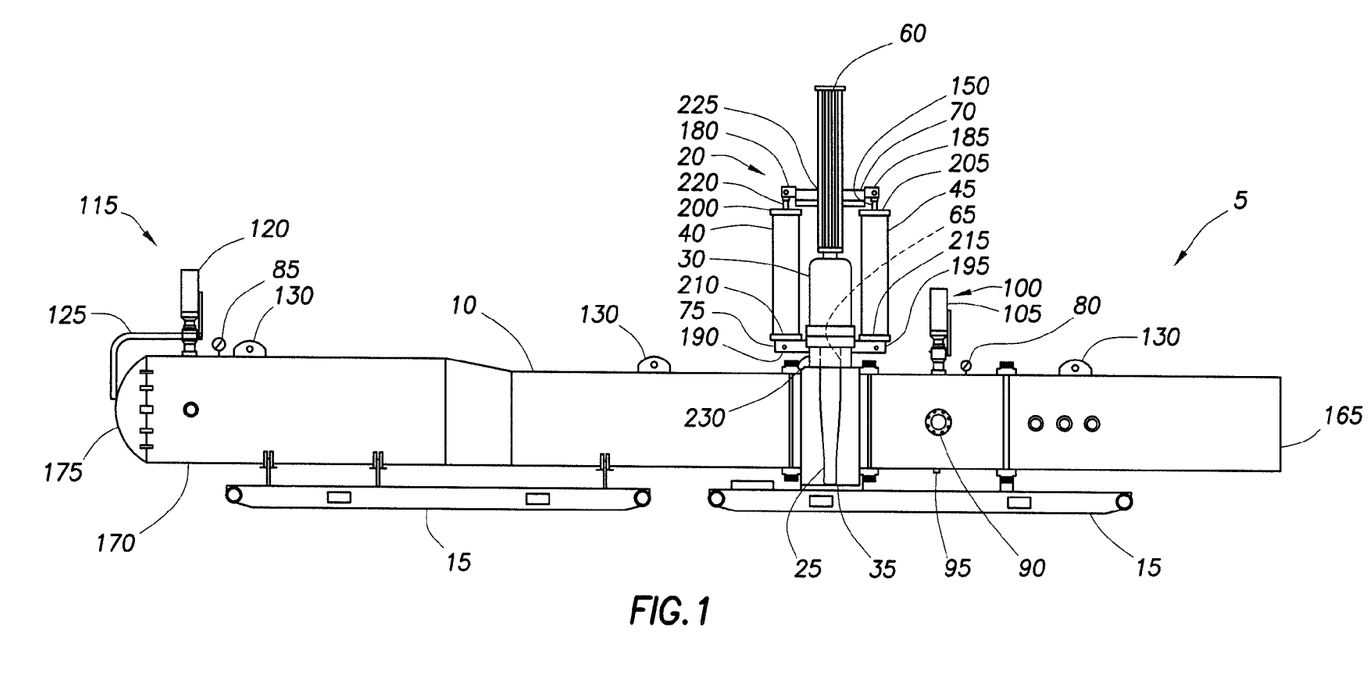
FIG. 1 illustrates an embodiment of a pig receiver, pig receiving unit, and pig gate valve assembly.

FIG. 1 illustrates pig receiver 5 having pig receiver unit 10, support 15, and pig gate valve assembly 20. Pig gate valve assembly 20 is secured to pig receiver unit 10 and allows pig receiver unit 10 to receive pigs (not illustrated) while additional pig or pigs may continue to progress through a pipeline (not illustrated). In an embodiment, pig receiver 5 is attached to the pipeline at pipeline contact end 165. The pigs enter pig receiver 5 at pipeline contact end 165. Pipeline contact end 165 may be attached to the pipeline by any suitable means.

Pig receiver unit 10 has any configuration suitable for facilitating passage of pigs therethrough. In an embodiment as illustrated in FIG. 1, pig receiver unit 10 has the typical configuration of a pipeline (e.g., substantially cylindrically shaped). In some embodiments as illustrated in FIG. 1, pig receiver unit 10 has an enlarged diameter on pig retrieval end 170, which is the end of pig receiver unit 10 longitudinally distal from pipeline contact end 165. Without being limited by theory, pig retrieval end 170 has an enlarged diameter because the enlarged diameter facilitates removing pigs from pig receiver unit 10. Pig receiver unit 10 has retrieval door 175. Retrieval door 175 is an openable and closeable door. In embodiments in which retrieval door 175 is open, pigs may be retrieved from pig receiver unit 10.

In some embodiments as illustrated in FIG. 1, pig receiver unit 10 also has take-off 90. In embodiments, take-off 90 allows for product or other material in pig receiver unit 10 to be removed. In an embodiment as illustrated in FIG. 1, take-off 90 is disposed on the surface of pig receiver unit 10 at a location between gate valve 25 and pipeline contact end 165. In some embodiments, pig receiver unit 10 has more than one take-off 90. In other embodiments as illustrated in FIG. 1, pig receiver unit 10 also has fastening means 130. Fastening means 130 include any means for fastening pig receiver 5 to a transportation means for transporting pig receiver 5 and/or for alignment of pig receiver 5 with a pipeline. In an embodiment as illustrated in FIG. 1, fastening means 130 is an eye fastener.

As shown in FIG. 1, pig gate valve assembly 20 includes gate valve 25, actuators 40 and 45, and cylinder guide 60. Gate valve 25 refers to an openable/closeable valve comprising a round, rectangular, or the like gate/wedge. Gate valve 25 includes gate valve seat 35. When gate valve 25 is in the closed position, gate valve seat 35 provides a seal that facilitates prevention of liquid leaking around gate valve 25. Gate valve 25 is attached to rod 65. In an embodiment as illustrated, gate valve 25 is attached to rod 65 on the longitudinal end of gate valve 25 distal to gate valve seat 35. Rod 65 is attached to tie bar 70. In an embodiment as illustrated, rod 65 is attached to tie bar 70 on the longitudinal end of rod 65 distal to gate valve 25. It is to be understood that rod 65 is shown in FIG. 1 by dashed lines for illustrated purposes only to show its location as rod 65 is not visible as shown from the side view of FIG. 1 (i.e., it is disposed within gate housing 30). Rod 65 and gate valve 25 are longitudinally moveable through the interior of gate housing 30. In an embodiment, gate housing 30 is secured to pig receiver unit 10. Gate housing 30 may be secured to pig receiver unit 10 by any suitable means. Cylinder guide 60 is secured to gate housing 30. Cylinder guide 60 extends longitudinally upward from gate housing 30. Pig gate valve assembly 20 also includes tie bar 70 and actuator support 75. Tie bar 70 and actuator support 75 are disposed on opposing ends of actuators 40, 45 from each other. Tie bar 70 has tie bar end 180 and tie bar end 185 on opposing longitudinal ends, and actuator support 75 has support end 190 and support end 195 on opposing longitudinal ends. Tie bar 70 is attached to both actuator 40 and actuator 45. Actuator 40 includes cylinder rod 220, and actuator 45 includes cylinder rod 150. In an embodiment, tie bar end 180 is attached to cylinder rod 220 at cylinder longitudinal end 200, and tie bar end 185 is attached to cylinder rod 150 at cylinder longitudinal end 205. In embodiments, tie bar ends 180, 185 may be attached to cylinder rods 220, 150, respectively, by any suitable means. Support ends 190, 195 may be secured to cylinder longitudinal ends 210, 215 by any suitable means. In an embodiment, cylinder longitudinal ends 210, 215 are disposed upon support ends 190, 195, with actuator support 75 providing physical support to actuators 40, 45. Tie bar 70 has tie bar opening 225 through which cylinder guide 60 may longitudinally pass therethrough. In an embodiment, actuator support 75 has support opening 230 through which a portion of gate housing 30 is disposed.

Figure 2:
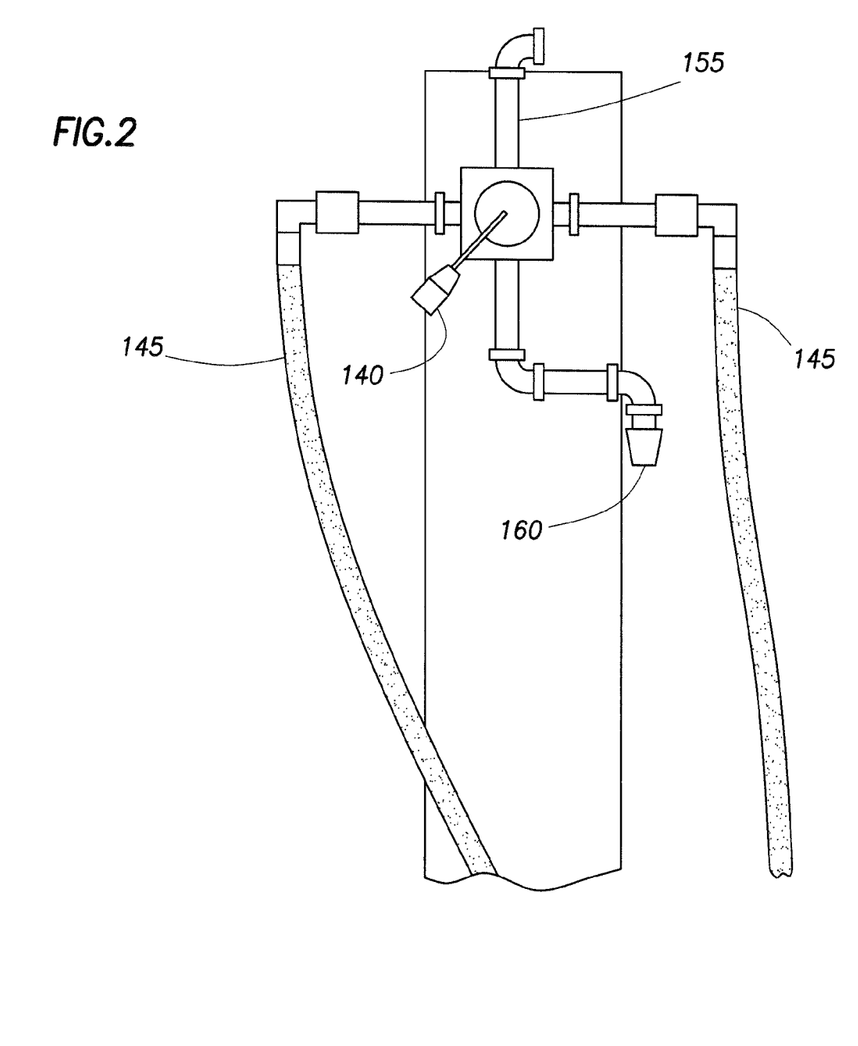
FIG. 2 illustrates an embodiment of an actuation system.

Actuators 40, 45 may include any suitable type of actuator for actuating opening and closing of gate valve 25. In embodiments, actuators 40, 45 are actuated by air and/or liquid (e.g., water). In embodiments, actuators 40, 45 are actuated by air. Actuators 40, 45 may have any suitable configuration for actuation of gate valve 25. In embodiments as illustrated in FIG. 1, actuators 40, 45 are cylindrical actuators. Actuators 40, 45 may be operated by any suitable means. FIG. 2 illustrates an embodiment of manual operation of actuators 40, 45. In an embodiment as illustrated, actuation lever 140 is operated between open and closed positions. In embodiments, the open position actuates actuators 40, 45, and the closed position stops their action. The actuating air and/or liquid are supplied from inlet 155 to actuators 40, 45 via actuation lines 145. The return actuating air and/or liquid may be exhausted via outlet 160. Actuation lever 140 may be disposed at any suitable location on pig receiver 5. In an embodiment, actuation lever 140 is disposed on a side of pig receiver 5. Without limitation, embodiments with two actuators 40, 45 facilitate prevention of bending of rod 65. In an embodiment, actuation of actuators 40, 45 includes actuation of cylinder rods 150, 220 either in an upward or downward direction (i.e., in relation to pig receiver unit 10).

In embodiments, gate valve 25 is moveable between open and closed positions. To move gate valve 25 to an open position from the closed position shown in FIG. 1, actuation lever 140 is moved to the open position. The actuating air and/or liquid flows through actuation lines 145 to actuators 40, 45 thereby actuating actuators 40, 45 to move cylinder rods 150, 220 upwards. Upward movement of cylinder rods 150, 220 causes upward movement of rod 65 (via tie bar 70) and thereby rod 65 pulls gate valve 25 upward. Tie bar 70 moves upward along with cylinder rods 150, 220. The vertical movement of cylinder rods 150, 220 is guided by tie bar 70 having cylinder guide 60 pass therethrough. Cylinder guide 60 facilitates tie bar 70 moving in a substantially vertical direction. It is to be understood that cylinder guide 60 and gate housing 30 are not moving. Cylinder rods 150, 220 move upward until gate valve 25 is in an open position. To close gate valve 25, actuation lever 140 is moved to the closed position. Actuators 40, 45 then move cylinder rods 150, 220 downward with rod 65 pushing gate valve 25 downward into pig receiver unit 10 until gate valve 25 is in a closed position (i.e., substantially no fluid flows around gate valve 25). In an embodiment, the open position of gate valve 25 is in a fully open position with gate valve 25 not restricting any fluid flow within pig receiver unit 10.

In embodiments as shown in FIG. 1, pig receiver 5 also includes supports 15. Supports 15 may include any size and configuration suitable for supporting the weight of pig receiver unit 10. Pig receiver 5 is not limited to two supports 15 but in alternative embodiments may include one support 15 or more than two supports 15. In some embodiments, pig receiver unit 10 includes drain 95.

As illustrated in FIGS. 1 and 2, an embodiment of operation of pig receiver 5 includes pig receiver 5 attached to a pipeline (not illustrated). A pig (not illustrated) is progressing through the pipeline. At this instance, no pig is disposed within pig receiver 5. With the pig progressing through the pipeline, gate valve 25 is in the open position, and retrieval door 175 is closed. In some embodiments, pig receiver unit 10 has exhaust valves 100, 115. Exhaust valve 100 is disposed on pig receiver unit 10 between pig gate valve assembly 20 and pipeline contact end 165. In an embodiment, exhaust valve 100 is located proximate to pig gate valve assembly 20. Exhaust valve 115 is disposed between pig gate valve assembly 20 and pig retrieval end 170. In an embodiment, exhaust valve 115 is disposed proximate retrieval door 175. Exhaust valves 100, 115 may be any type of pressure relief valves suitable for exhausting pressure from pig receiver unit 10. In embodiments, exhausts valves 100, 115 are used to regulate and maintain a constant pressure in pig receiver unit 10. In some embodiments as illustrated, exhaust valves 100, 115 have exhaust silencers 105, 120, respectively. In embodiments as illustrated, a pressure gauge 80 measures the pressure of pig receiver unit 10 upstream of pig gate valve assembly 20. In an embodiment, pressure gauge 80 is disposed proximate exhaust valve 100. Additionally, in embodiments as illustrated, a pressure gauge 85 measures the pressure of pig receiver unit 10 downstream of pig gate valve assembly 20. In an embodiment, pressure gauge 85 is disposed proximate exhaust valve 115. When the pig passes pig gate valve assembly 20, the pig gate valve assembly 20 is actuated with actuators 40, 45 moving cylinder rods 150, 220 downward and pushing gate valve 25 into the closed position by cylinder rods 150, 220 pushing rod 65 downward. With gate valve 25 in the closed position, additional pigs may run in the pipeline. In embodiments, both exhausts valves 100, 115 remain open. In an embodiment, pressure gauge 85 is monitored, and if it shows a desired pressure, then retrieval door 175 is opened, and the pig is removed. In an embodiment as illustrated, exhaust valve 115 has lever 125. In an embodiment, lever 125 is disposed to provide an end of lever 125 sufficiently in front of retrieval door 175 to prevent opening of retrieval door 175 until the pressure in pig retrieval end 170 is at a desired pressure. When at a desired pressure, lever 125 is actuated (and the blocking end of lever 125 is no longer preventing opening of retrieval door 175), and retrieval door 175 is opened with the pig then being removed. With the pig removed, retrieval door 175 is closed, and pig gate valve assembly 20 is actuated to move gate valve 25 up to the open position. The next pig is then run through pig receiver 5, and the process may continue as desired.

Figure 3:
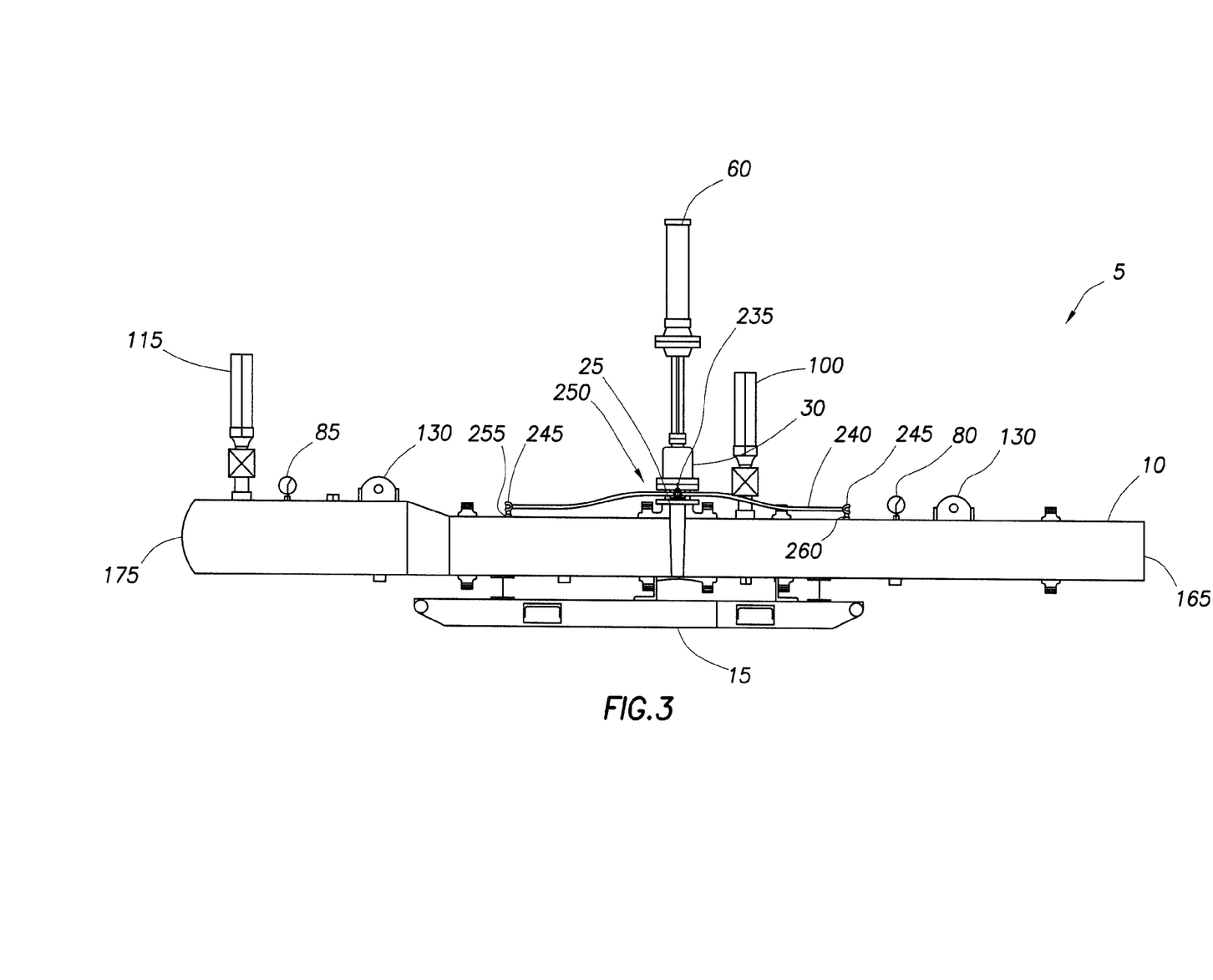
FIG. 3 illustrates an embodiment of a pig receiver having a pressure equalization system.

FIG. 3 illustrates an embodiment of pig receiver 5 having a pressure equalization system 250. Pressure equalization system 250 has pressure equalization valve 235 and pressure line 240. Pressure equalization system 250 facilitates adjusting the pressure in pig receiver unit 10 downstream of gate valve 25. Pressure line 240 is connected to pig receiver unit 10 on each side of gate valve 25 at downstream pressure connection 255 and upstream pressure connection 260, respectively. As illustrated, downstream pressure connection 255 is connected to pig receiver unit 10 downstream of gate valve 25 at a suitable location between gate valve 25 and retrieval door 175. In an embodiment, downstream pressure connection 255 is disposed at a suitable location between fastening means 130 and gate valve 25. Upstream pressure connection 260 is connected to pig receiver unit 10 upstream of gate valve 25 at a suitable location between gate valve 25 and pipeline contact end 165. In an embodiment, upstream pressure connection 260 is disposed at a suitable location between gate valve 25 and fastening means 130. Pressure line 240 may be any line suitable for use with a pipeline. Pressure equalization valve 235 controls the pressure flow through pressure line 240. Pressure equalization valve 235 may be any type of valve suitable for use with a pig receiver. For instance, in an embodiment, pressure equalization valve 235 is a ball valve. Pressure equalization valve 235 may be disposed at any suitable location on pressure line 240. In an embodiment, pressure equalization valve 235 is disposed about equidistant between downstream pressure connection 255 and upstream pressure connection 260. In embodiments, pressure equalization valve 235 is disposed proximate to gate valve 25. In some embodiments as illustrated, downstream pressure connection 255 and/or upstream pressure connection 260 have a muffler 245.

As illustrated in FIG. 3, an embodiment of operation of pressure equalization system 250 includes closing gate valve 25 or in which gate valve 25 is closed. In such an embodiment, pressure equalization valve 235 is in a closed position. In an embodiment, pressure equalization valve 235 is in a closed position when gate valve 25 is closed. In some embodiments, pressure equalization valve 235 is opened when gate valve 25 is in a closed position or when gate valve 25 is being closed. With gate valve 25 in a closed position and pressure equalization valve 235 open, the pressure downstream of gate valve 25 is adjusted via pressure line 240 by the pressure from upstream of gate valve 25. In an embodiment, the pressure downstream is adjusted to be about equal with the pressure upstream. In some embodiments, the pressure upstream and downstream of gate valve 25 is about equalized via pressure line 240.

It is to be understood that pig gate valve assembly 20 is not limited to two actuators (actuators 40, 45). In alternative embodiments (not illustrated), pig gate valve assembly 20 has one actuator. In other alternative embodiments (not illustrated), pig gate valve assembly 20 has more than two actuators.

It is to be further understood that tie bar 70 and cylinder guide 60 facilitate cylinder rods 150, 220 to move substantially parallel in relation to each other.

Figure 4:
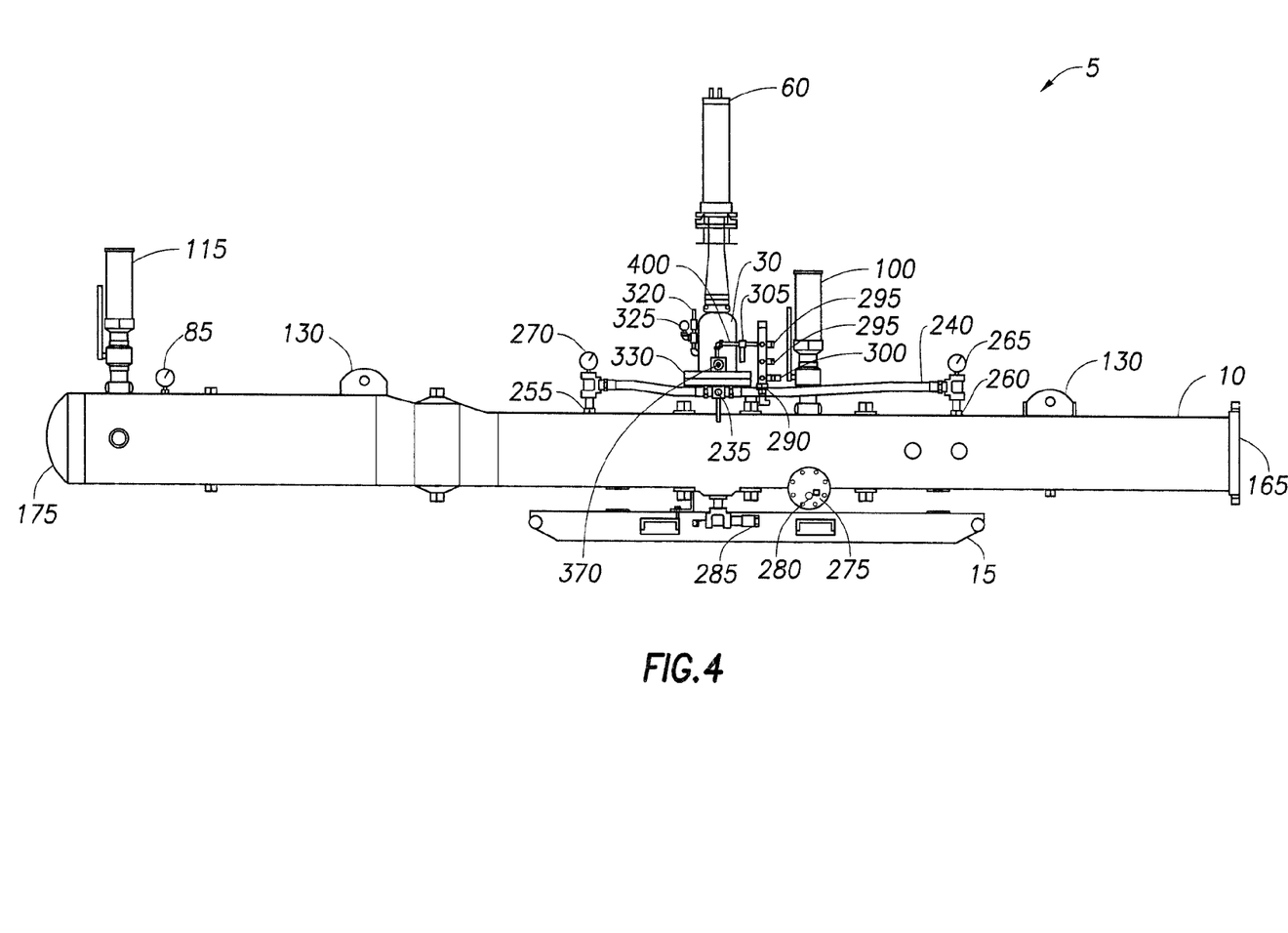
FIG. 4 illustrates an embodiment of a pig receiver having a contaminant removal system.

In some embodiments as shown in FIG. 4, upstream pressure connection 260 has pressure gauge 265 and/or downstream pressure connection 255 has pressure gauge 270.

Figure 5:
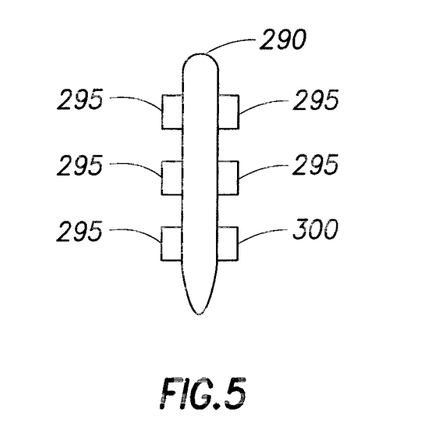
FIG. 5 illustrates an embodiment of a manifold.
Figure 7:
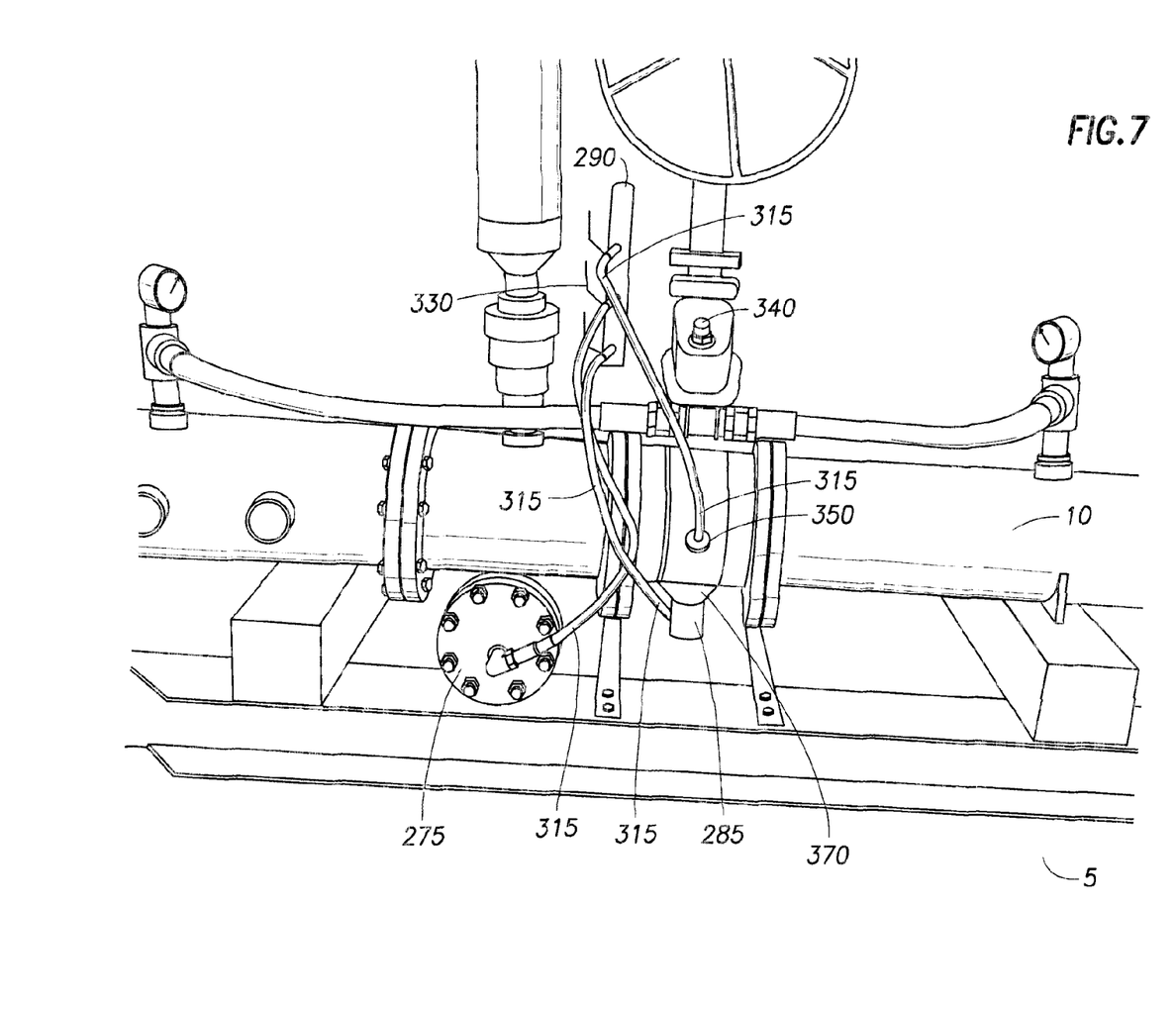
FIG. 7 illustrates a side perspective view of an embodiment of a pig receiver having a contaminant removal system.
Figure 8:
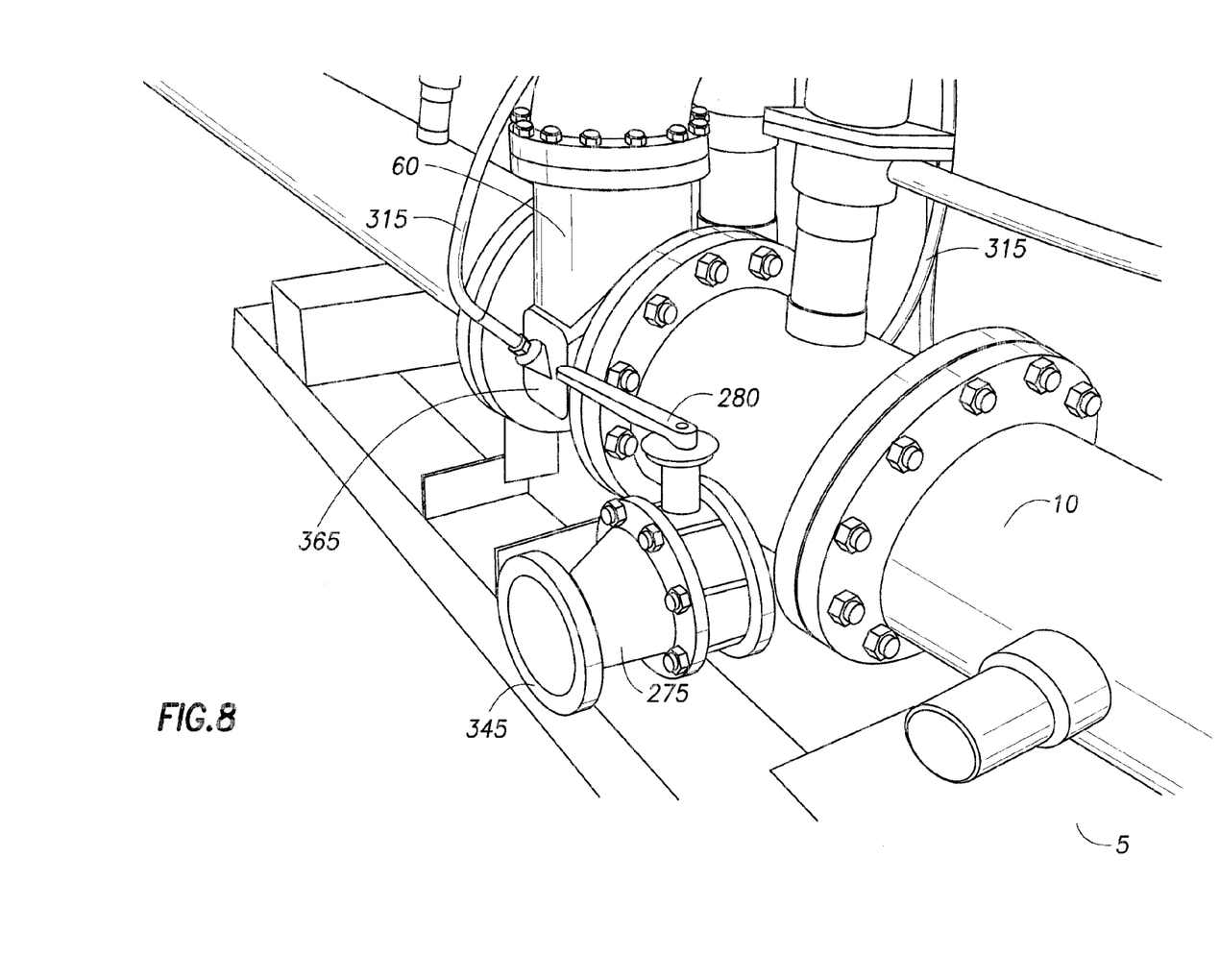
FIG. 8 illustrates a side perspective view of an embodiment of a pig receiver having a contaminant removal system.
Figure 9:
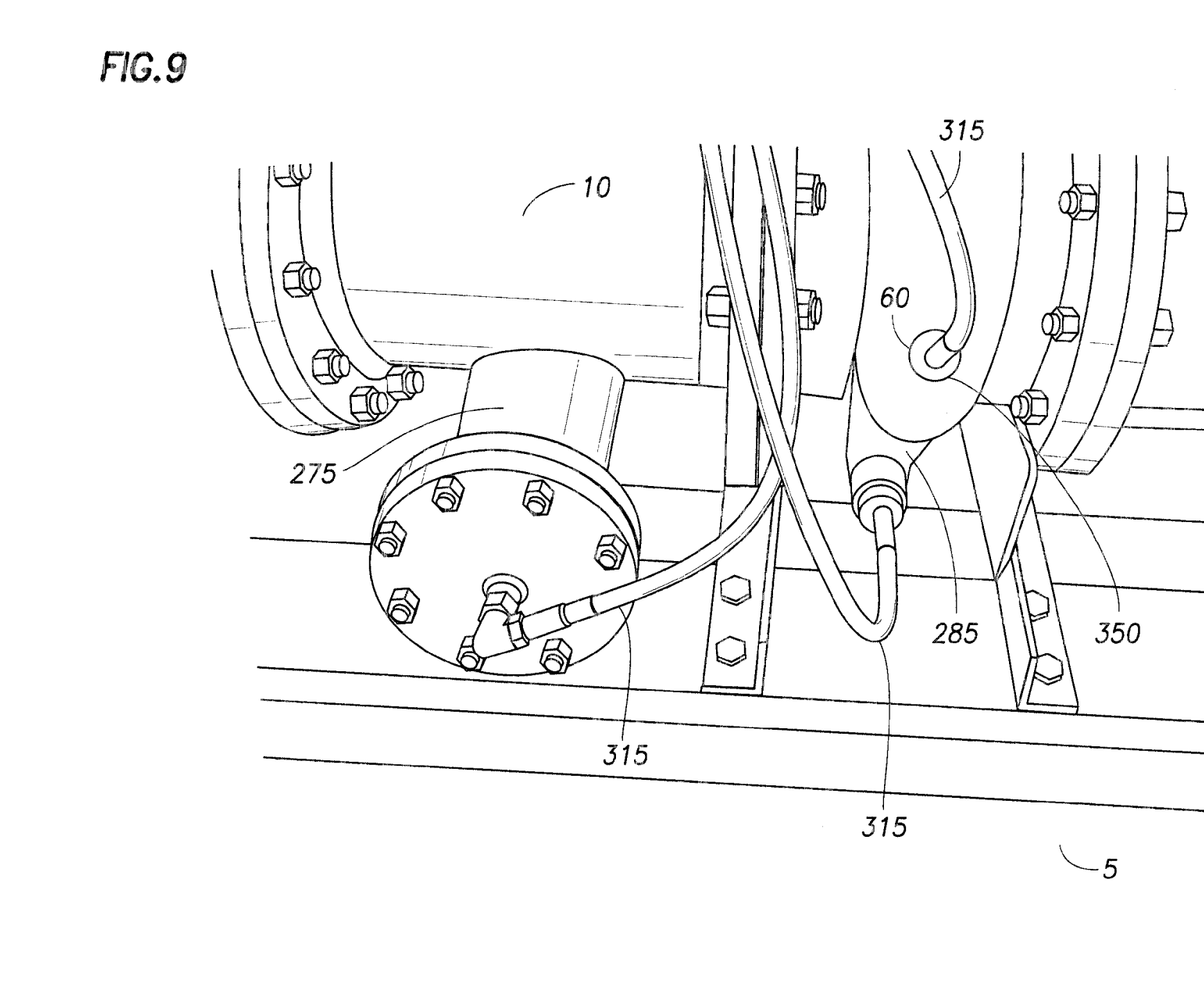
FIG. 9 illustrates a side perspective view of a portion of an embodiment of a pig receiver having a contaminant removal system.

FIG. 4 illustrates an embodiment of pig receiver 5 in which pig receiver 5 has a contaminant removal system that includes manifold 290. FIG. 5 shows an embodiment of manifold 290. FIG. 7 shows a side view of pig receiver 5 with manifold 290, and FIG. 8 shows a side perspective view of pig receiver 5 with fluid lines 315. FIG. 9 shows a side view of a bottom side portion of pig receiver 5 with the contaminant removal system. Manifould 290 has an interior through which fluid flows. In an embodiment as shown, manifold 290 has fluid feed port 300 by which fluid is fed to manifold 290. Fluid feed port 300 is shown disposed about near the bottom of manifold 290, but in alternative embodiments (not illustrated) fluid feed port 300 may be disposed at any other suitable location on manifold 290. The fluid is fed to manifold 290 and flows therethrough, exiting manifold 290 through a fluid outlet port 295. Manifould 290 may have any desirable number of fluid outlet ports 295. In embodiments, each fluid line 315 is attached to a fluid outlet port 295. In an embodiment, the contaminant removal system includes fluid piping 400. Fluid piping 400 is connected to manifold 290 and gate housing 30. In some embodiments as shown, each fluid outlet port 295 has an open/close valve 330, which opens and closes the applicable fluid outlet port 295 to the fluid. In some embodiments as shown in FIG. 4, contaminant removal system includes lubricator 305. Lubricator 305 provides lubrication that may be carried with the fluid (i.e., air) to gate valve 25. In an embodiment, lubricator 305 is disposed on fluid piping 400. In embodiments, fluid flows through fluid piping 400 from manifold 290. Lubricator 305 adds the lubrication to the fluid, which is then carried by the fluid with the lubrication through fluid piping 400 to gate housing 30. The fluid with lubrication contacts the surfaces in pig gate valve assembly 20 to lubricate such surfaces. Any lubrication may be used that is suitable for lubricating machinery, metal parts, and the like.

The fluid may be any fluid suitable for removing contaminants from pig receiver 5. Without limitation, contaminants include solids, obstructions, viscous material, tar-like material, and the like. In embodiments, the fluid is air, gas, water, solvent, or any combinations thereof. In an embodiment, the fluid is air. The solvent may be any solvent suitable for removing contaminants such as viscous material and/or tar-like matter. Without limitation, examples of suitable solvents include ethanol, hydrogen peroxide, or any combinations thereof.

As shown in FIG. 4, the fluid exits manifold 290 and is fed to a desired portion of pig receiver 5, via fluid line 315 and/or fluid piping 400. Fluid line 315 may be any line suitable for allowing the fluid to flow therethrough. In an embodiment, fluid line 315 comprises rubber. Fluid piping 400 may be any piping suitable for allowing the fluid to flow therethrough, such as, without limitation, metal piping.

In an embodiment as shown in FIG. 4, fluid from manifold 290 is fed through fluid line 315 to the bottom portion of gate housing 30 at gate sealing area 370. Gate sealing area 370 is the area in which gate valve 25 is sealed against the interior of pig receiver unit 10. The fluid is fed to the bottom portion of gate housing 30 at gate housing port 350. In some embodiments, an open/close valve 330 is disposed at gate housing port 350. Open/close valve 330 is in the open position to allow the fluid into gate housing 30. The fluid flows through gate sealing area 370 to remove contaminants. In an embodiment, the fluid is fed to gate housing 30 with two fluid lines 315. In an embodiment, the two fluid lines 315 are on opposing sides of gate housing 30 from each other. In alternative embodiments (not illustrated), more than two fluid lines 315 provide fluid to gate housing 30.

FIGS. 4 and 7 show an embodiment of the contaminant removal system in which gate housing 30 has bonnet bleed valve 320. In embodiments, bonnet bleed valve 320 is attached to gate housing 30 at bonnet bleed port 340. Bonnet bleed valve 320 is any valve suitable for relieving pressure on gate housing 30. Bonnet bleed valve 320 relieves pressure in gate housing 30. In embodiments, bonnet bleed valve 320 relieves pressure in gate housing 30 to facilitate opening of gate valve 25.

In other embodiments as shown in FIGS. 4 and 7, an embodiment of contaminant removal system includes gate housing 30 having bonnet pressure gauge 325. Bonnet pressure gauge 325 may be any gauge suitable for measuring pressure in gate housing 30. In embodiments, bonnet pressure gauge 325 measures pressure in gate housing 30. In some embodiments, bonnet pressure gauge 325 measures pressure in gate housing 30 when gate valve 25 is operating. In an embodiment, bonnet bleed gauge 325 is attached to gate housing 30 at bonnet bleed port 340.

In embodiments as shown in FIGS. 4, 7, 8, and 9, contaminant removal system also includes pig receiver 5 having bottom valve 285. In an embodiment, bottom valve 285 is disposed below pig receiver unit 10. In embodiments as shown, bottom valve 285 is disposed on support 15. Bottom valve 285 is attached to the bottom of pig receiver unit 10. In embodiments, bottom valve 285 is attached to the bottom of a slot (not illustrated) in which gate valve 25 seats. As shown, fluid with contaminants from gate sealing area 370 also flow and remove contaminants from gate valve 25 (i.e., the bottom of gate valve 25) as the fluid flows through gate valve 25. The fluid with contaminants exits gate valve 25 through bottom valve 285. The fluid with contaminants may be removed from bottom valve 285. In such embodiments, the fluid with contaminants may be directed from bottom valve 285 to a retrieval device (not illustrated) such as a container or line. In an embodiment, a fluid line 315 may provide fluid to bottom valve 285 to provide further force to the contaminants and facilitate their removal to the retrieval device.

Figure 6:
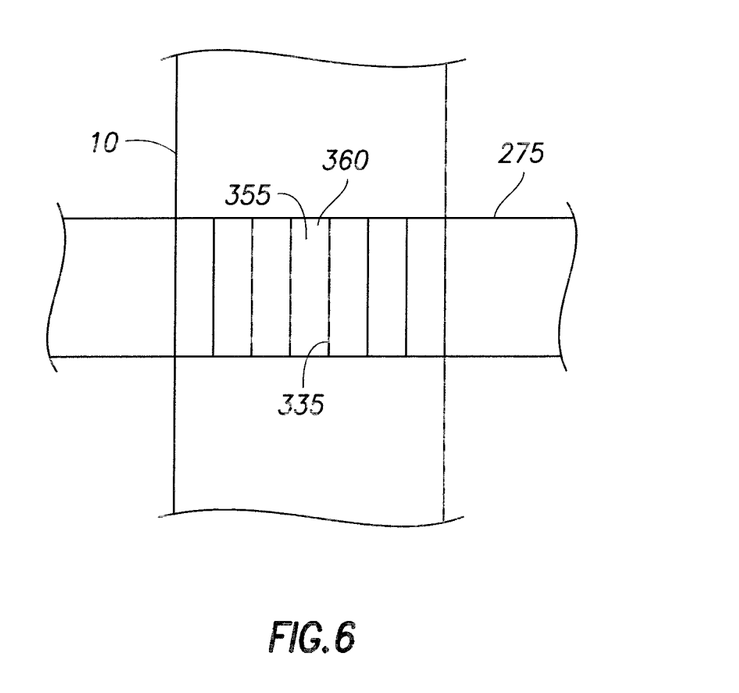
FIG. 6 illustrates a top cross sectional view of an embodiment of a sump and a pig receiver unit 10.

In embodiments as shown in FIGS. 4, 6, 7, 8, and 9, the contaminant removal system also includes pig receiver 5 having sump 275. FIG. 6 shows a top cross sectional view of sump 275 and pig receiver unit 10. Sump 275 is disposed at a bottom portion of pig receiver unit 10. Sump 275 may be disposed at any suitable longitudinal location of pig receiver unit 10. In embodiments as shown, sump 275 is disposed between gate valve 25 and upstream pressure connection 260. Embodiments of sump 275 have sump valve 280 and sump outlet 345. In an embodiment as shown in FIG. 6, sump 275 has a plurality of sump bars 335. In an embodiment as shown, sump bars 335 extend laterally across sump 275 and in a direction about parallel to the direction in pig receiver unit 10 at which a pig travels. In some embodiments, sump bars 335 extend in a direction about perpendicular to a side of sump 275. It is to be understood that sump 275 is not limited to sump bars 335 extending in such a direction, but in alternative embodiments (not illustrated) sump bars 335 may extend in other suitable directions. Between each sump bar 335 is a sump gap 355, which is the open area between each sump bar 335. Without limitation, sump gap 355 has a sufficient width to allow contaminants to fall from pig receiving unit 10 through sump bars 335 to bottom portion 360 of sump 275 but does not have a width that substantially interferes with the velocity at which the pig travels in pig receiving unit 10. In an embodiment, fluid (i.e., air) from manifold 290 flows through a fluid line 315 to sump 275. The fluid flows longitudinally through sump 275 to remove contaminants disposed in bottom portion 360. For instance, contaminants passing through pig receiver unit 10 pass between sump bars 335 and through sump gaps 355 to bottom portion 360. The fluid with contaminants exits sump 275 through sump outlet 345. Sump valve 280 may be regulated to open and close sump outlet 345. In some embodiments, a container (not illustrated) may be attached to sump outlet 345 to collect contaminants. Without limitation, the air supply in pig receiver 5 that propels the pig and the fluid (i.e., air) both remove contaminants. For instance, the air that propels the pig may force the contaminants into bottom portion 360.

Although the present invention and its advantages have been described in detail, it should be understood that various changes, substitutions and alterations may be made herein without departing from the spirit and scope of the invention as defined by the appended claims.

What is claimed is:
1. A method for retrieving a pipeline pig, comprising:
(A) allowing the pipeline pig to run into a pig receiver, wherein the pig receiver comprises:
a pig receiver unit comprising a retrieval door; and a pig gate valve assembly disposed on the pig receiving unit, comprising:
- a gate valve, wherein the gate valve is in an open position;
- a first actuator and a second actuator;
- a cylinder guide;
- a tie bar, wherein actuation of the tie bar actuates the gate valve;
- wherein an end of the tie bar is attached to the first actuator and an opposing end of the tie bar is attached to the second actuator; and
- a contaminant removal system, wherein the contaminant removal system includes removing contaminants from the pig receiver unit with fluid;

(B) actuating the pig gate valve assembly to move the gate valve to a closed position;

(C) opening the retrieval door; and (D) retrieving the pig.

2. The method of claim 1, wherein the fluid comprises air, gas, water, solvent, or any combination thereof.

3. The method of claim 1, wherein the fluid comprises air.

4. The method of claim 1, wherein the fluid is fed to the pig receiver with a fluid line.

5. The method of claim 4, wherein the fluid line is attached to the pig receiver and a manifold.

6. The method of claim 5, wherein a fluid line is connected to the manifold, and wherein the pig gate valve assembly comprises a gate housing, and wherein the fluid line is also connected to the gate housing.

7. The method of claim 6, wherein the gate housing comprises a bonnet bleed valve and/or a bonnet pressure gauge.

8. The method of claim 1, wherein the pig receiver comprises a bottom valve.

9. The method of claim 8, wherein the bottom valve is attached to a bottom of a slot in which the gate valve seats.

10. The method of claim 1, further comprising a sump.

11. The method of claim 10, wherein the sump comprises sump bars.

12. The method of claim 1, wherein the first actuator and the second actuator are activated with an actuation lever.

13. The method of claim 1, wherein the pig receiver unit further comprises an exhaust valve.

14. The method of claim 13, wherein the exhaust valve is disposed between the pig gate valve and an end of the pig receiver unit.

15. The method of claim 13, wherein the exhaust valve has an exhaust silencer.

16. The method of claim 13, wherein the exhaust valve has a lever.

17. The method of claim 1, wherein the pig receiver unit further comprises a pressure gauge.

18. The method of claim 17, wherein the pressure gauge is disposed proximate to an exhaust valve.

19. The method of claim 1, wherein the pig gate valve assembly further comprises a pressure equalization system.

20. The method of claim 19, wherein the pressure equalization system further comprises a pressure equalization valve.

* * * * *